United States Patent
Irving

(10) Patent No.: US 10,415,228 B2
(45) Date of Patent: Sep. 17, 2019

(54) SHOWER DRAIN BOX

(71) Applicant: FLOW CONTROL LLC, Beverly, MA (US)

(72) Inventor: Michael H. Irving, Haverhill, MA (US)

(73) Assignee: Flow Control LLC, Beverly, MA (US)

(*) Notice: Subject to any disclaimer, the term of this patent is extended or adjusted under 35 U.S.C. 154(b) by 0 days.

(21) Appl. No.: 15/712,805

(22) Filed: Sep. 22, 2017

(65) Prior Publication Data

US 2018/0080211 A1 Mar. 22, 2018

Related U.S. Application Data

(60) Provisional application No. 62/398,139, filed on Sep. 22, 2016.

(51) Int. Cl.
| | |
|---|---|
| *E03F 5/10* | (2006.01) |
| *E03F 5/18* | (2006.01) |
| *E03F 7/10* | (2006.01) |
| *B60R 15/00* | (2006.01) |

(52) U.S. Cl.
CPC ............... *E03F 5/18* (2013.01); *B60R 15/00* (2013.01); *E03F 5/107* (2013.01); *E03F 7/103* (2013.01)

(58) Field of Classification Search
CPC ............. E03F 5/18; E03F 5/107; B60R 15/00
USPC .......................................................... 4/320
See application file for complete search history.

(56) References Cited

U.S. PATENT DOCUMENTS

| | | | |
|---|---|---|---|
| 2,829,598 A | 4/1958 | Zimmerman et al. | |
| 2,981,196 A | 4/1961 | Zimmermann et al. | |
| 3,563,384 A * | 2/1971 | DeLaney | E03D 9/10 4/320 |
| 3,758,236 A | 9/1973 | Zimmerman | |
| 3,824,632 A * | 7/1974 | Bach | E03D 5/016 4/320 |
| 4,776,631 A | 10/1988 | Sargent et al. | |

(Continued)

FOREIGN PATENT DOCUMENTS

| | | |
|---|---|---|
| CN | 104343163 A | 2/2015 |
| DE | 199950302 A1 | 7/2000 |
| EP | 0378680 A1 | 7/1990 |

OTHER PUBLICATIONS

"Porta-Pak Holding Tank Deodorizer and Waste Digester, Fresh & Clean Scent," Camping World, campingworld.com, Catalog Item # 23913, printed Sep. 2016, Copyright notice dated 2016.

(Continued)

*Primary Examiner* — Tuan N Nguyen
(74) *Attorney, Agent, or Firm* — Ware, Fressola, Maguire & Barber LLP

(57) ABSTRACT

A drain or sump box features a combination of a housing, a pump, a float switch and a deodorant bar retainer. The housing may include a housing floor and a wall structure attached thereto and configured to receive and contain waste water. The pump is arranged in the housing to respond to signaling for pumping the waste water from the housing. The float switch is arranged in the housing to sense the level of the waste water and provide the signaling to turn the pump on when the waste water exceeds a certain level. The deodorant bar retainer is arranged in the housing in the housing to receive and retain a deodorant bar for preventing, reducing or masking waste water odor and associated bacteria causing the waste water odor.

8 Claims, 4 Drawing Sheets

(56) References Cited

U.S. PATENT DOCUMENTS

| | | | |
|---|---|---|---|
| 4,868,932 A | 9/1989 | Thoma et al. |
| 4,903,723 A | 2/1990 | Sublett |
| 5,039,402 A | 8/1991 | Himelstein |
| 5,074,119 A | 12/1991 | Anderson |
| 5,100,540 A | 3/1992 | Ramirez et al. |
| 5,139,655 A | 8/1992 | Sigler |
| 5,142,707 A | 9/1992 | Prue |
| 5,147,532 A | 9/1992 | Leek, Jr. |
| 5,186,821 A | 2/1993 | Murphy |
| 5,265,992 A | 11/1993 | Jensen |
| 5,317,766 A | 6/1994 | McDonald et al. |
| 5,759,387 A | 6/1998 | Iivilkes |
| 6,143,185 A | 11/2000 | Tracy et al. |
| 6,474,111 B1 | 11/2002 | Pattee |
| 6,976,367 B2 | 12/2005 | Spanger |
| 7,346,938 B2 | 3/2008 | Mattson, Jr. et al. |
| 7,597,116 B2 | 10/2009 | Detwiler |
| 8,578,522 B1 | 11/2013 | Helmstetter et al. |
| 8,696,897 B2 | 4/2014 | Marugame |
| 8,906,232 B2 | 12/2014 | McInnis |
| 8,920,657 B2 | 12/2014 | Kawasaki |
| 2002/0185081 A1 | 12/2002 | Schrader |
| 2013/0232685 A1 | 9/2013 | Cornille |
| 2016/0061484 A1 | 3/2016 | Wu et al. |

OTHER PUBLICATIONS

"Standard Shower Sump Pump System, 750 GPH," Walmart, walmart.com, Walmart #: 000915914, printed Sep. 2016.

"Seaflo 600 GPH 12 Volt Automatic Shower Sump Draining kit Marine RV Caravans Motorhomes Camper Trailers Boat," AliExpress™, aliexpress.com, Model Number: SFBP1-G600-07, printed Sep. 2016, Copyright notice dated 2010-2016.

"Shower Sump System," Rule Industries, 2006, website, printed Nov. 27, 2017. https://www.westmarine.com/buy/rule-industries--shower-sump-system-2-8a-12v--P011_331_001_508.

"Amarine-made Boat Marine Shower Sump Pump Drain Kit System Shower Pump System—12V-750GPH-Multi-port Inlet", Aug. 13, 2015, website, printed Nov. 27, 2017. <URL: https://www.amazon.com/Amarine-made Marine-Shower-Drain-System/dp/B00NCLNNQM/ref=cm_cr_arp_d_product_top?ie=UTF8>.

* cited by examiner

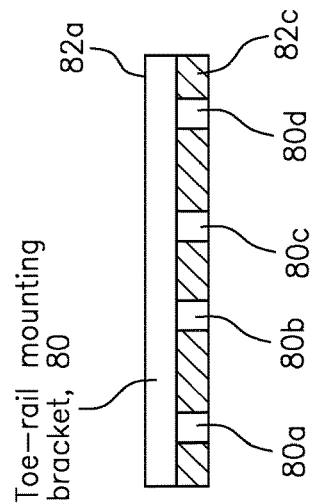
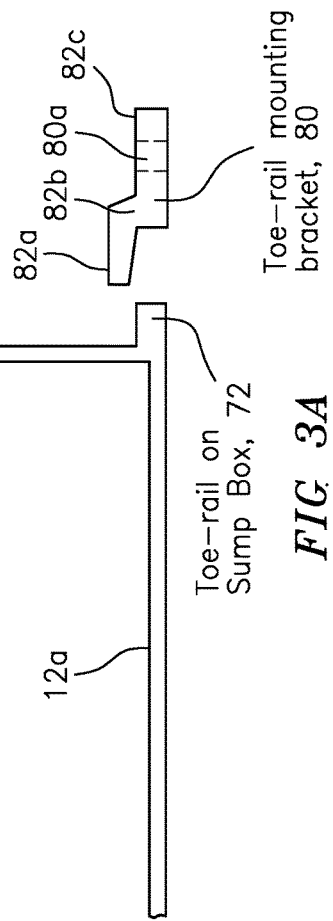
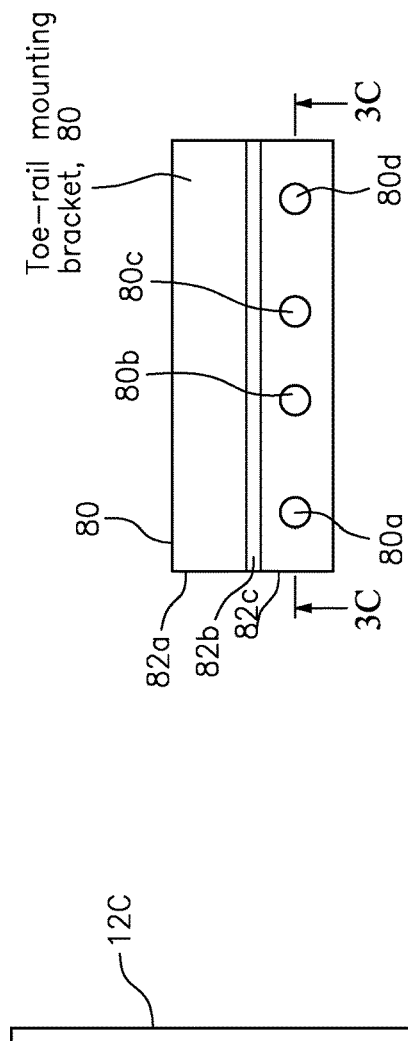
FIG. 3: Details of Back Mounting Foot

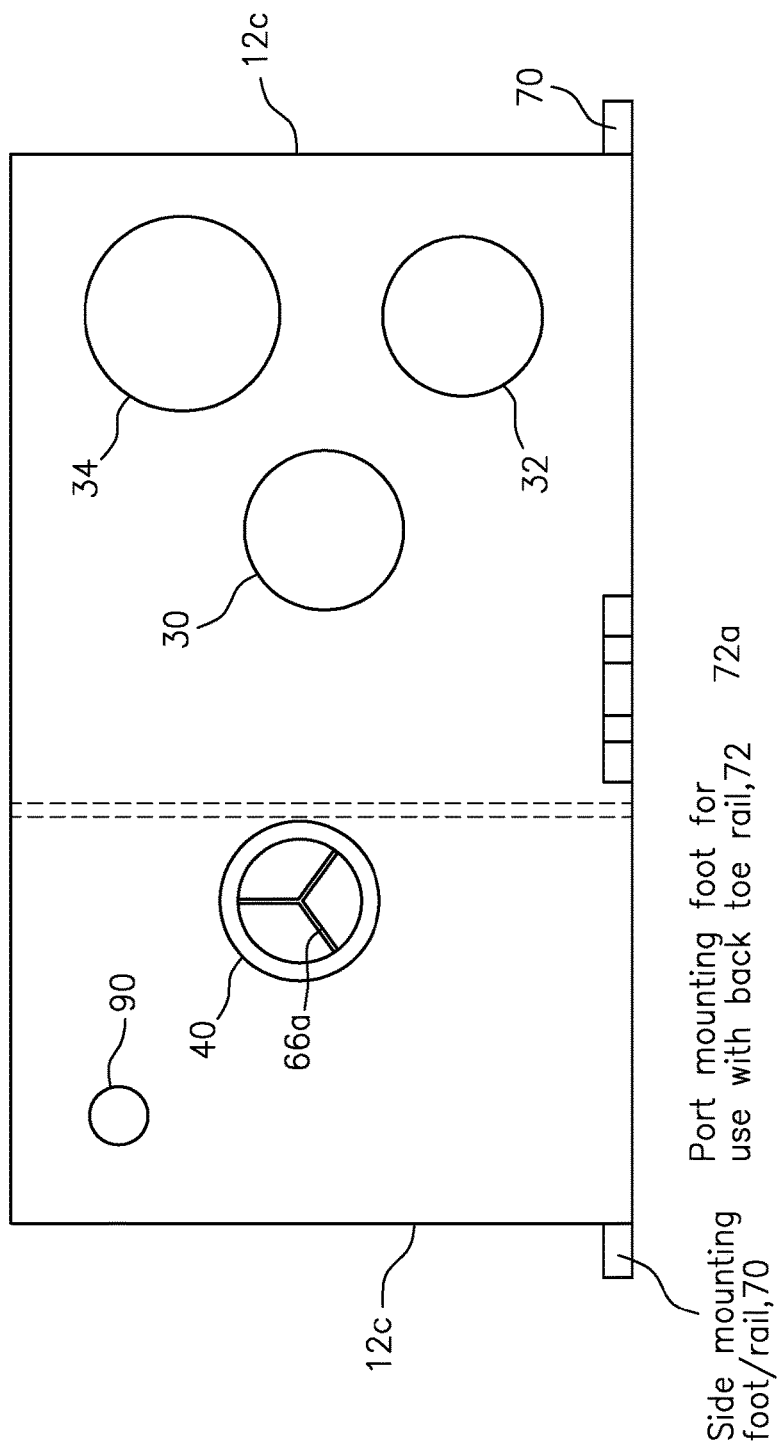

SHOWER DRAIN BOX

CROSS-REFERENCE TO RELATED APPLICATIONS

This application claims benefit to provisional patent application Ser. No. 62/398,139, filed 22 Sep. 2016, which is incorporated by reference in their entirety.

BACKGROUND OF THE INVENTION

1. Field of Invention

The present invention relates to a drain or sump box; and more particularly to a shower drain for using in a boat/RV/aircraft/vehicle.

2. Description of Related Art

Shower box drains, and related products, act as a reservoir to collect waste water from different parts of a boat/RV/aircraft/vehicle. By way of example, these sources of waste water may include, but are not limited to, showers, sinks, ice makers, A/C units, refrigerators. Once the waste water reaches a certain level, a small pump is activated to eject the waste water from the boat/RV/aircraft/vehicle.

Examples of other devices known in the art include the following:
  Attwood 500 GPH Shower Sump.
  SEAFLO DC Shower Sump Pump System Box Multi Inlet 12V 750 GPH.

One of the biggest issues customers in the marketplace are facing is the foul smell or stench of the stagnant water collected in the drain box. For example, the drain box typically contains at least some waste water that is not pumped out. If a customer uses the boat for the weekend and leaves it for two weeks, then when they return, the smell or stench of the waste water left remaining in the drain box can sometime be overwhelming. For example, in boats the shower drain typically won't have a pee trap to prevent odor from rising into the bathroom from the drain box.

Shortcoming of the known device in the art also include the following:
  It is known in the art to use either a tube strainer which limits the amount of debris that can collect in the strainer before becoming blocked, or a strainer around the pump, which both make the drain box very difficult to clean and keep clean.
  In some installations it may be very difficult to install the shower drain box, especially if it's against a vertical wall such as a bulkhead or stringer.

In view of the aforementioned, there is a need in the art for a better way to manage waste water in, e.g., boat/RV/aircraft/vehicle.

SUMMARY OF THE INVENTION

The Basic Invention

To eliminate such smell or stench of waste water, the present invention includes the creation of a drain box or unit having a new and unique retainer for a deodorant bar or block, which could be either paraben or paraben-free (depending on the application). The present invention also include a designated space for a deodorant block to help prevent or mask those odors, something the prior art devices don't have. Each drain box or unit may also be sold with a deodorant block to reduce smell and help eliminate bacteria that could cause the smell or stench.

Moreover, the present invention also introduces a flat scoop strainer which allows a customer/user to clean the waste (e.g., which is mostly hair) much easier than prior art devices. The scoop strainer allows the customer/user to get their fingers under the strainer and lift out the debris with much less effort.

The drain box includes a snap-fit removable cover that allows for easy access to the deodorant bar or block and the scoop strainer.

In addition to the deodorant block and scoop strainer, the present invention also includes a toe-rail, e.g. for the front, back or sides of the drain box. The customer/user will be able to install the toe-rail to lock in the front, back or sides of the drain box or unit and anchor the front, back or sides with a single screw under a port area, making it much easier to install the drain box or unit.

Some of the other key features include the following:
  a snap close cover or lid;
  a gasket sealed lid; and
  one or more threaded input/output ports.

Specific Embodiment

According to some embodiments, the present invention may take the form of a drain or sump box featuring a new and unique combination of a housing, a pump, a float switch and a deodorant bar retainer.

The housing may include a housing floor and a wall structure attached thereto and configured to receive and contain waste water.

The pump may be configured or arranged in the housing to respond to signaling for pumping the waste water from the housing.

The float switch may be configured or arranged in the housing to sense the level of the waste water and provide the signaling to turn the pump ON when the waste water exceeds a certain level, and to turn the pump OFF when the waste water is below the certain level.

The deodorant bar retainer may be configured or arranged in the housing to receive and retain a deodorant bar for preventing, reducing or masking waste water odor and associated bacteria causing the waste water odor.

According to some embodiments, the present invention may include one or more of the following features:

The drain or sump box may be a shower drain box for configuring in a boat, recreational vehicle or aircraft.

The deodorant bar retainer may include a deodorant bar retainer wall structure arranged on the housing floor in relation to the wall structure of the housing to receive and retain the deodorant bar.

The deodorant bar retainer wall structure may include at least two retainer walls arranged in relation to at least one housing wall and arranged substantially at a right angle to contain the deodorant bar in a box-like retaining structure.

The drain or sump box may include a strainer scoop structure arranged and extending from the housing floor configured to catch hair and other debris in the waste water received in the drain or sump box.

The strainer scoop structure may include two or more strainer supports arranged and extending vertically from the housing floor and configured to support a strainer for catching hair and other debris in the waste water received in the drain or sump box.

The drain or sump box may include one or more inlets/outlet ports configured to receive the waste water from one or more of a shower, a sink, an ice maker, an A/C unit or a refrigerator, and to provide pumped waste water from the housing.

The one or more inlets/outlet ports may include threaded inlets/outlet ports, e.g., for receiving or coupling to inlets/outlet adapters for coupling suitable hosing to the inlets/outlet ports.

The housing may include one or more toe rails extending from one or more of its outside walls; and the drain or sump box may include a toe-rail mounting bracket may be configured to fasten the toe rail to flooring of a boat, recreational vehicle or aircraft with a single screw/fastener. The toe rails may include side toe rails, and front and back toe rails. The toe rails, also known herein as mounting feet, may include apertures or holes for receiving fasteners.

One advantage of the present invention is that it provides a better a shower drain for using in a boat/RV/aircraft/vehicle.

BRIEF DESCRIPTION OF THE DRAWING

The drawing includes FIGS. 1-4, which are not necessarily drawn to scale, as follows:

FIG. 3 includes FIGS. 3A thru 3C, as follows:

FIG. 3A shows a hand drawn diagram having a partial side view of a housing of a drain or sump box having a toe-rail, according to some embodiments of the present invention;

FIG. 3B shows a hand drawn diagram having a top down view of a toe-rail like that shown in FIG. 3A, according to some embodiments of the present invention; and FIG. 3C shows a hand drawn diagram having a cross-sectional view (from the bottom to the top of the page) along lines 3B-3B in FIG. 3B of the toe-rail in FIG. 3B, according to some embodiments of the present invention.

FIG. 4 shows a hand drawn diagram having a port side view of a side of a housing of a drain or sump box having inlet and outlet ports, according to some embodiments of the present invention.

Figure 1:
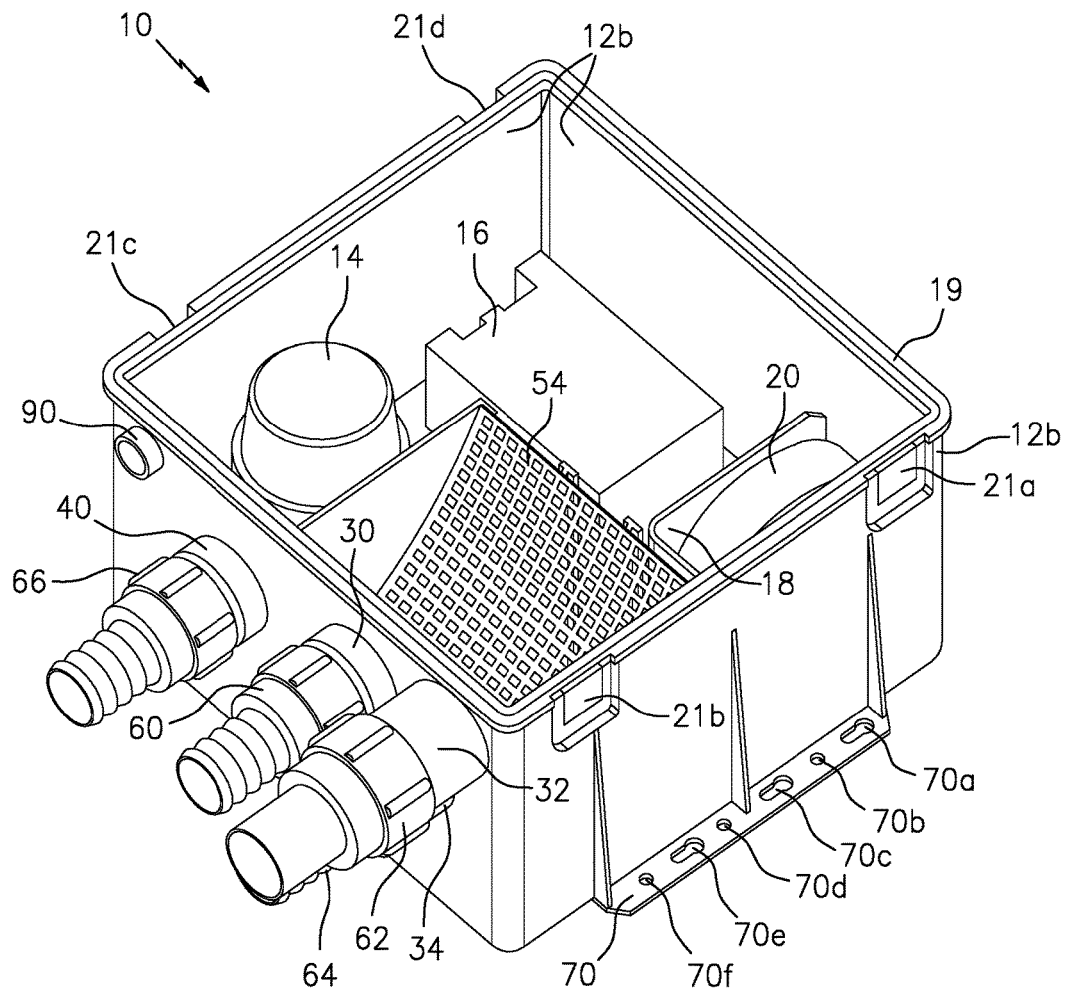
FIG. 1 shows a computer aided rendition having a perspective view of a drain or sump box having a deodorant bar retainer when viewed from the port side, according to some embodiments of the present invention.

In the drawing, every element is not labeled with every reference no. and lead line to reduce clutter in the drawing as a whole.

DETAILED DESCRIPTION OF BEST MODE OF THE INVENTION

FIGS. 1-4 show the present invention in the form of a drain or sump box generally indicated as 10, featuring a new and unique combination of a housing 12, a pump 14, a float switch 16 and a deodorant bar/block retainer 18. The drain or sump box 10 may be, or take the form of, a shower drain box for configuring in a boat, recreational vehicle, aircraft or vehicle.

The housing 12 may include a housing floor 12a and a housing wall structure having housing walls, each indicated as 12b, attached thereto and configured to receive and contain waste water. The waste water may be received from one or more inlet ports 30, 32, 34.

The pump 14 may be configured or arranged in the housing 12 to respond to signaling for pumping the waste water from the housing 12. The waste water may be pumped from the housing via an outlet port 40.

The float switch 16 may be configured or arranged in the housing 12 to sense the level of the waste water contained in the housing 12 and provide the signaling to turn ON the pump 14 when the waste water exceeds a certain level L, and to turn the pump 14 OFF when the waste water is below the certain level.

The drain or sump box 10 may also include a removable cover 19 latched or coupled to the housing 12 by snap-latches 21a, 21b, 21c, 21d, e.g., configured to releasably grip ends of the cover 19 and hold the cover 19 in a closed position. The snap-latches 21a, 21b, 21c, 21d may be released in order to remove the cover 19 to gain access to the inside of the housing 12.

Figure 2:
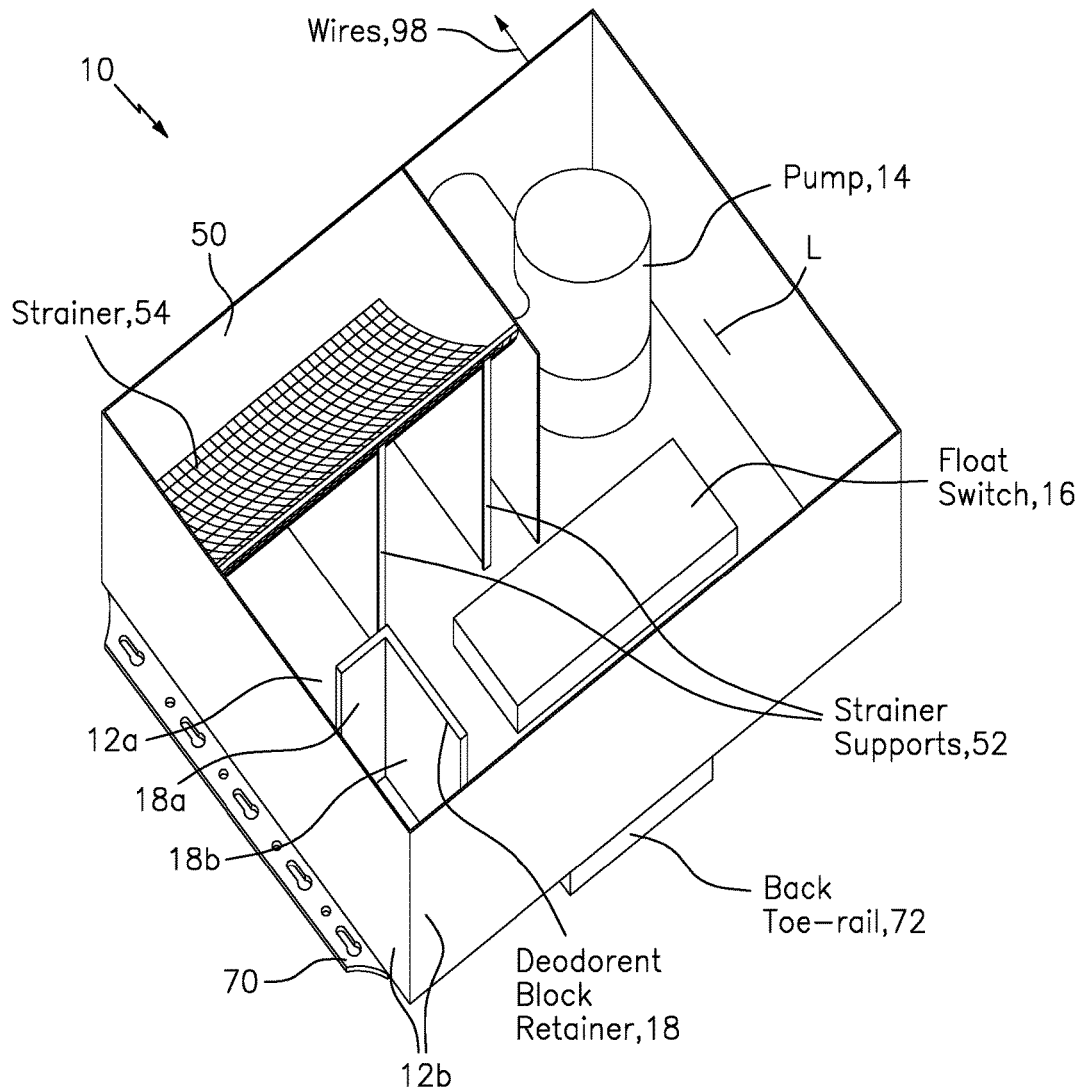
FIG. 2 shows a hand drawn diagram having a perspective view of a drain or sump box having a deodorant bar retainer when viewed from the other non-port side, according to some embodiments of the present invention.

The deodorant bar retainer 18 may be configured or arranged in the housing 12 and has at least two retainer walls 18a, 18b (FIG. 2), e.g., configured substantially at a right angle and arranged in relation to one or more housing walls 12b and the housing floor 12a to receive and retain a deodorant bar/block 20 (see FIGS. 1 and 2). The deodorant bar/block 20 is arranged in the drain or sump box 10 for preventing, reducing or masking waste water odor and associated bacteria causing the waste water odor. The deodorant bar retainer 18 may form part of an integrally molded drain or sump box 10.

The drain or sump box 10 may include a strainer scoop structure generally indicated as 50 arranged and extending from the housing floor 12a and configured to catch hair and other debris in the waste water. Consistent with that shown in FIGS. 1-2, the strainer scoop structure 50 is arranged inside the housing 12 to receive incoming waste water from one or more inlet ports 30, 32, 34. The strainer scoop structure 50 may include two or more strainer supports 52 as labeled in FIG. 2 arranged and extending from the housing floor 12a and configured to support a removable screen or strainer 54 for catching hair and other debris in the waste water. In FIGS. 1-2, the support structures 52 have curved or sloping top portions for receiving a corresponding curved or sloping removable screen or strainer 54, which is configured or dimensioned to fit into the strainer scoop structure 50, as shown, and be easily removed for cleaning.

The drain or sump box 10 may include the one or more inlets ports 30, 32, 34 configured to receive the waste water from one or more of a shower, a sink, an ice maker, an A/C unit or a refrigerator. The screen or strainer 54 catches the hair and other debris in the waste water entering the inlet ports 30, 32, 34 and received in the housing 12.

The one or more inlets ports 30, 32, 34 may include threaded inlets/ports, e.g., for receiving inlet port adapters 60, 62, 64 that thread onto the threaded inlets ports 30, 32, 34. The outlet port 40 may include a threaded outlet port, e.g., for receiving an outlet port adapter 66 that threads onto the threaded outlet port 40, e.g., which may be configured with a check valve 66a that may include or take the form of a joker valve as shown in FIG. 4. The inlet/outlet port adapters 60, 62, 64, 66 allow for the flexible and adaptable coupling of suitable hosing onto the inlet/outlet ports 30, 32, 34 and 40. For example, one type of inlet/outlet port adapters 60, 62, 64, 66 may be used for one type of suitable hosing, and another type of inlet/outlet port adapters 60, 62, 64, 66 may be used for another type of suitable hosing, e.g., giving the customer interchangeable inlet/outlet port adapter options for configuring interchangeable hosing options.

The housing 12 may include one or more toe rails or mounting feet 70, 72 extending from one or more of its outside walls 12c. Consistent with that shown in FIG. 1, the housing 12 and the one or more toe rails 70 and mounting feet 72 may be integrally formed as part of a single molded housing unit. By way of example, the one or more toes rails 70 may include side toes rails, and the one or more mounting feet may include a front and/or back mounting foot 72, as shown in FIG. 4. The side toe rail 70 may include one or more holes or apertures 70a, 70b, 70c, 70d, 70e, 70f (FIG. 1) configured or formed therein, e.g., for receiving one or more screw/fastener (not shown). According to some embodiments, the front/back mounting feet 72 may include apertures or holes 72a configured or formed therein for receiving a fastener to fasten the drain or sump box to flooring (not shown) of a boat, recreational vehicle or aircraft with a single screw/fastener (not shown), as one skilled in the art would appreciate.

According to some embodiments, the drain or sump box 10 may also include one or more corresponding toe-rail mounting brackets 80 that may be configured to fasten the one or more mounting feet 72 to flooring (not shown) of a boat, recreational vehicle or aircraft with a single screw/fastener (not shown), as one skilled in the art would appreciate. As shown in FIG. 3, the toe rail mounting bracket 80 may include a first toe rail portion 82a, a second toe rail portion 82b, and a third toe rail portion 82c, where the second toe rail portion 82b couples the first toe rail portion 82a to the third toe rail portion 82c at respective 80-90° angles. When the first toe rail portion 82a is mounted on the flooring (not shown) of the boat, recreational vehicle or aircraft, the third toe rail portion 82c is raised above the flooring to engage the mounting foot 72 and fasten the drain or sump box with the one or more screw/fastener (not shown). The first toe rail portion 82a may include one or more holes or apertures 84a, 84b, 84c, 84d (FIG. 3) configured or formed therein, e.g., for receiving the one or more screw/fastener (not shown).

Consistent with that shown in FIG. 4, the housing 12 may include a vent, hole or aperture 90 configured or formed to pass thru the housing wall 12c to allow gas to pass from inside the drain or sump box 10, e.g., to prevent a build-up of noxious fumes therein. By way of example, FIG. 4 includes some suitable dimensions for the inlet ports 30, 32, 34, the outlet 40 and the vent 90, e.g. according to some embodiments of the present invention.

FIG. 2 also shows wires or wiring 98 for providing power to the drain or sump box 10 to power the pump 14 and/or the float switch 16, depending on the particular application.

Pumps and Float Switches

Pumps and float switches like elements 14 and 16 are known in the art, and the scope of the invention is not intended to be limited to any particular type or kind thereof either now known or later developed in the future.

Possible Applications

Possible applications include: Marine, Recreational Vehicle, Small Aircraft, Remote/Off Grid Lifestyle, e.g., for implementing in a shower drain box, marine sump, shower sump, low-odor sump, sink drain

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A drain or sump box, comprising:
   a housing having a housing floor and a housing wall structure attached thereto and configured to receive and contain waste water;
   a pump configured or arranged in the housing to respond to signaling for pumping the waste water from the housing;
   a float switch configured or arranged in the housing to sense the level of the waste water and provide the signaling to turn the pump on when the waste water exceeds a certain level, and to turn the pump off when the waste water is below the certain level; and
   a deodorant bar retainer configured or arranged in the housing, having a deodorant bar retainer wall structure with at least one retainer wall attached to the housing floor and the housing wall structure to receive and retain a deodorant bar for preventing, reducing or masking waste water odor and associated bacteria causing the waste water odor.

2. The drain or sump box according to claim 1, wherein the drain or sump box is a shower drain box for configuring in a boat, recreational vehicle or aircraft.

3. The drain or sump box according to claim 1, wherein the at least one retainer wall comprises two retainer walls arranged substantially at a right angle to contain the deodorant bar in a box-like structure.

4. The drain or sump box according to claim 1, wherein the drain or sump box comprises a strainer scoop structure arranged and extending from the housing floor configured to catch hair and other debris in the waste water.

5. The drain or sump box according to claim 4, wherein the strainer scoop structure comprises two or more strainer supports arranged and extending from the housing floor configured to support a strainer for catching hair and other debris in the waste water.

6. The drain or sump box according to claim 1, wherein the drain or sump box comprises one or more inlets/outlet ports configured to receive the waste water from one or more of a shower, a sink, an ice maker, an A/C unit or a refrigerator, and to provide pumped waste water from the housing.

7. The drain or sump box according to claim 6, wherein the one or more inlets/outlet ports include threaded inlets/outlet ports.

8. The drain or sump box according to claim 1, wherein the housing comprises one or more toe rails extending from an outside wall; and
   the drain or sump box comprises one or more toe-rail mounting brackets configured to fasten the one or more toe rails to flooring of a boat, recreational vehicle or aircraft with a single screw/fastener.

* * * * *